United States Patent Office 3,153,633
Patented Oct. 20, 1964

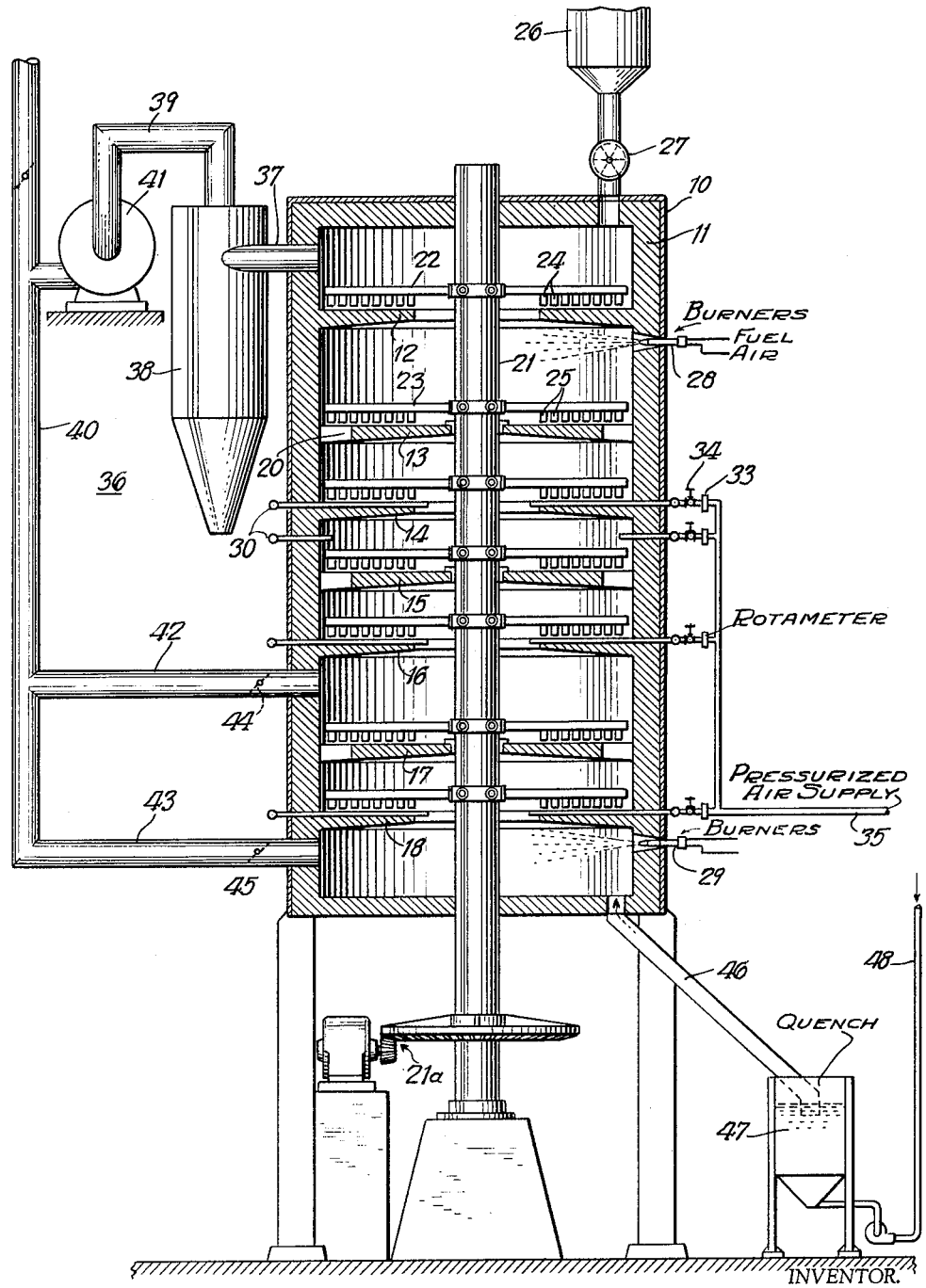

3,153,633
METHOD FOR REGENERATION OF GRANULAR ACTIVATED CARBON
Charles F. von Dreusche, Jr., Cresskill, N.J., assignor to Nichols Engineering & Research Corporation, New York, N.Y., a corporation of Delaware
Filed June 5, 1961, Ser. No. 114,949
5 Claims. (Cl. 252—418)

This invention relates to the regeneration of granular activated carbon adsorbents.

The invention relates more particularly to improvements in the process of regeneration whereby the size of the furnace required to treat a given input of carbon is materially reduced.

The invention also relates to improvements whereby a more even treatment assures a uniform regeneration of all the granules being treated at any given time.

The invention also relates to a process whereby the granular activated carbon adsorbent is regenerated by passage through a multiple hearth furnace under controlled conditions of temperature, amount of oxygen, amount of steam and amount of inert gas in the furnace atmosphere.

The invention also relates to the discovery and utilization of the important factors controlling the regeneration of granular activated carbon adsorbents and the manner in which these factors are inter-related one to the other.

In the early days of regeneration of granular adsorbents, the adsorbent—usually bone char—was allowed to pass downward through the vertical pipes of a char kiln. The upper portions of these pipes were externally heated by passing across them the gaseous products of combustion at from 900° to 1200° F. The lower portions of the pipes were externally air cooled so that the char could discharge therefrom without the carbon content starting to burn. The rate of discharge was controlled by any one of several mechanisms by which it was hoped to keep the char in the heated zone until it was properly regenerated.

The heat transfer conditions in such char kilns left much to be desired. Thus it was not uncommon to have char emerging from the kiln bottom which showed on test a high degree of contamination by the bacteria which commonly infest operations dealing with carbohydrate solutions. The advances whereby it became possible to regenerate bone char in a multiple hearth furnace are set forth in U.S. Patent 2,616,858 to Gillette et al. This process has found use in the regeneration of bone char in the refining of cane sugar.

More recently there have become available a variety of activated carbons in granular form, made from coal, lignite, petroleum, coke cellulosic materials, etc. Carbons of various grades are available from the Pittsburgh Coke and Chemical Co. of Pittsburgh, Pa. The preparation of similar carbons is described in Technical Paper No. 47 of the Fuel Research Board of the British Department of Scientific and Industrial Research of 1938 by J. G. King et al. These carbons suitably modified find use in the purification and decolorization of inorganic and organic aqueous solutions of acids, salts, alcohols, caustic plating baths, carbohydrates, and a wide variety of materials including water for process or for boiler feed. After these carbons have become saturated by adsorbtion of color, odor, or other impurities, they are regenerated by thermal treatment.

In the early days after their introduction, attempts were made to regenerate these carbons in the old style pipe type char kilns. These were barely able to regenerate char at from 900° to 1200° F. Since temperatures of from 1400° to 1800° F. are needed for carbon, the results were not satisfactory.

Attempts were also made to regenerate these carbons in multiple hearth kilns using the features set forth in the Gillette et al. patent cited above, but using materials of construction suitable for the higher temperatures involved. It was found that, while regeneration by this means was feasible, the size of multiple hearth furnace required for the amounts of carbon used on most industrial operations was very large and expensive due to the special conditions imposed by the character of the carbons themselves.

A careful examination of the problem, including a complete re-evaluation of the approach, has resulted in the discovery of the individual factors involved and their inter-relation. This has made it possible to increase the "burn-rate," i.e., the pounds of carbon volatilized per hour per square foot of hearth area, from the order of 0.125 lb./hr./sq. ft. to from 0.30–0.50 lb./hr./sq. ft. The size of the furnaces needed to regenerate a given tonnage of carbon by means of this invention has been materially reduced.

The following four factors have been found to be controlling and inter-dependent in achieving this increased burn-rate: (1) the rate of heat addition; (2) the addition of supplemental air; (3) the dissipation of heat; and (4) the contact between carbon and the atmosphere above it.

In considering these factors and their relative importance in regeneration of granular activated carbons, it must be realized that the oxydative regeneration of such carbons presents special and unique problems. Reverting, for example, to the regeneration of bone char, one is there dealing with a composite consisting of about 90% by weight porous mineral matter with about 10% carbon disposed throughout. Because of its porous mineral structure, local overburning of the carbon in the bone char is minimized. Moreover, bone char has a limited capacity to adsorb organic matter, i.e., from 1/20 to 1/40 that of granular activated carbon. Consequently it is of little importance whether in any one pass the organic material is converted to coke rather than being burned in the regenerative process. Indeed it is not uncommon for the carbon content of bone char to rise due to the coking of the organic matter taken up from the solutions treated. In some instances special steps have been required to burn out excess carbon on a routine basis.

In contrast with this, when regenerating granular activated carbon, the main constituent is carbon (40 to 95%) from which must be burned the material adsorbed in the fine pores, which give the carbon its activity. If the carbon is underburned, the coke formed will remain to clog these pores and cause the carbon to lose activity. On the other hand, if the carbon is overburned, the pores become enlarged causing both a loss of activity as well as a physical loss of adsorbent from the system. In this connection it should be borne in mind that a physical loss of about 5% of the carbon per cycle resulting from attrition, dusting, burning or any other cause, approaches the economic limit for many carbon applications. It is therefore apparent that the problem of regenerating granular activated carbons can roughly be stated as "How does one burn off the impurities without burning up the carbon itself?"

It is the discovery of the importance, relation and utilization of the four factors above stated, which has enabled the achieving of hitherto unknown burn-off rates.

As to the first, it has been found that it is of primary importance that the rate of heat addition to the regenerating zone be not only carefully controlled but also be accomplished by incremental means. This results from the fact that gasification of carbonaceous impurities is best accomplished by exposing the carbon to a reactive atmosphere containing carbon dioxide or water vapor or both.

The presence of appreciable quantities of oxygen in the atmosphere in immediate contact with the carbon causes too violent an action resulting in enlarged pores, loss of surface per unit weight, and poor activity. The reactions between carbon and carbon dioxide and/or water vapor to give gaseous products, are both endothermic. For these reasons to proceed at the maximum rate desired and to the desired extent, heat must be added in substantial quantities. However, the extent to which heat can be added at any one point is limited by the temperature to which the hearth atmosphere may permissibly be elevated, ranging from about 1600° F. to 1900° F. at the maximum, the upper limit being set by the materials of construction. It has been found, as distinguished from Gillette et al., which employs an external heating or combustion chamber the temperature of which is tempered by recycle gas, that it is highly desirable to employ, according to the present invention, a multiplicity of burners, usually more than one per hearth, and usually the application of burners to more than one hearth.

By so doing, i.e., by employing burners at more than one location on a hearth, and by installing them at more than one hearth, a distribution of the heat additions can be achieved which will introduce the desired amount of thermal energy without localizing its application to a point where the permissible temperature limits are exceeded.

It has also been found as a second essential step of the invention, that it is necessary to introduce into the hearth atmosphere a carefully controlled quantity of supplemental air over and above that required for combustion by the burners. This air accomplishes three desirable effects. First the contained oxygen reacts with the carbon monoxide and the hydrogen in the hearth atmosphere. Both of these reactions are exothermic, so that these supplemental air streams function to generate additional sources of heat. Also, both of the aforesaid reactions remove from the hearth atmosphere the end products of the carbon volatilization reactions, and replenish the hearth atmosphere with the desirable volatilization reagents, carbon dioxide and water vapor.

With reference to the above, and except for starting up operation, the burners as a source of heat may in many instances be dispensed with, and only the heat from the supplemental air addition utilized for reaction with $CO+H_2$. Heat from the supplemental air addition is released uniformly over a wide area, probably in the interfacial boundary layer between the carbon bed and gas phase where transfer is most easily accomplished. Relying only on such heat from supplemental air minimizes the problem of heat dissipation presented by utilization of the burners.

A third function of the supplemental air is the introduction of a given amount of cold, inert nitrogen which contributes to the dissipation of heat, this being the third essential step to be taken for acheiving high burn off rates.

The introduction of the supplemental air can be accomplished in a variety of ways. Thus, it may be introduced into the passages between the hearths at points where it will mix well with the gases moving from hearth to hearth, but away from the points where the carbon is falling from an upper hearth to the next one below. In this manner the carbon is not exposed to gases containing an appreciable amount of oxygen. Or it can be introduced as excess air through the burners, i.e., in amount over and above that required for burner combustion. Or it may be added into the recycled gas stream. In any event, it must be carefully controlled in amount and appropriately distributed to avoid localized concentrations of oxygen and the impingement of the fresh air stream on the carbon, and also to prevent localized overheating due to the reaction of the air with the hearth atmosphere.

The nitrogen added with the supplemental air contributes to the general action of heat dissipation but does not of itself suffice for this. As contrasted with the reactivation of bone char, the reactivation of granular activated carbon has been found to generate appreciable amounts of heat, particularly when high burn-off rates concentrate the liberation to a minimum of hearth area. Therefore the process of the invention requires means of dissipating this excess energy, since the materials of construction of the furnace limit the permissible temperatures to from 1850° to 1900° F. Also similar considerations limit the permissible temperatures in the gas recycle system which contains fans, cyclones and ducts to 1000° F. or below.

Therefore, in addition to the action of the supplemental air, supplemental means of dissipating heat that may be employed are: (a) recycling the coolest gases available, such as those from the top hearths where the evaporation of the water contained in the carbon has cooled the gases; (b) cooling the recycled gases by eliminating insulation on the surfaces of ducts, cyclones, fans, etc.; (c) promoting heat losses in the furnace design by minimizing or eliminating insulation, water cooling available surfaces of the furnace, and promoting heat losses through rabble arms and center shafts; (d) spraying water into the recycle gas stream; and (e) cooling the furnace walls with pipes through which water is circulated.

All of these means for dissipating heat are in marked contrast with the normal practice of regenerating bone char where any factor which tends to adsorb heat is avoided. Thus one critical factor—the water in the char going to the kiln is minimized. The air used to cool the center shafts is utilized to dry the char. In short, the regeneration of bone char is not an exothermic process, whereas the regeneration of granular activated carbons under conditions of high burn-off rates has been found to be exothermic.

The fourth step of the process of the invention in its optimum state results from increasing the frequency of exposure of the granules of carbon in the bed on each hearth to the atmosphere over the bed with corresponding decrease in the length of time each granule is exposed. If the carbon granules are handled like bone char, the advantages of the above steps will be lost. The granules at the surface will be over-treated and they will form a protective mask over the granules below the surface of the bed. By bringing the carbon granules to the surface more frequently, the advances outlined above can be fully utilized. This more frequent turn over is accomplished in several ways: (a) by increasing the speed of rotation of the center shaft; (b) by increasing the number of rabbling teeth on each rabble arm; (c) by reversing the direction of some of the teeth on the rabble arms; and (d) by various combinations of the above. In general the aim is to achieve as frequent changes of surface of the carbon bed as is possible without sacrificing retention time in the furnace.

While each of the above factors is important by itself, it should be recognized that it is the combined utilization of all four that provides the optimum burn-off rate in accordance with the basic objective of the invention.

Before presenting comparative test results with respect to the "burn rates" in the regeneration of granular activated carbon, achieved by the present invention as compared to practices heretofore employed, reference will be had to the accompanying drawing for description of an appropriate kiln construction for practicing the invention, wherein the kiln is depicted in axial sectional elevation.

Referring to the drawing, the furnace consists of a cylindrical shell 10, of sheet steel or the like, lined with a refractory material 11, and mounting a series of hearths, as at 12–18, incl., having alternately disposed central and peripheral openings therethrough, as at 19, 20. A shaft 21 extends through the vertical axis of the furnace, and is rotatably driven by an electric motor and gear drive 21a. Carried by the shaft 21, are radially extending arms, as at 22, 23, equipped with rabble teeth or rakes, as at 24, 25, the teeth of which are spaced slightly above the hearths as shown, a series of such arms and rakes being provided for each hearth in the manner illustrated in the drawing.

The granular activated carbon to be regenerated is fed into the furnace from a hopper 26 through a star valve 27 for providing a gas seal. Mounted in the sidewalls of the furnace are a plurality of burners, as at 28, 29, supplied with a mixture of fuel and air as indicated, for combustion purposes, the particular position of the burners as shown in the drawing being merely illustrative and not by way of limitation as to their total number or particular locations with respect to the various hearths. Also penetrating the sidewalls of the furnace are a series of air tubes, as at 30, supplied through rotometers and air valves, as at 33, 34, with air under pressure from a supply line as at 35, these air tubes as shown in the drawing also being merely illustrative of the manner in which the air is brought into the furnace, and not by way of limitation with respect to any particular hearth or hearths thereof, to which the air is supplied.

The furnace gases are recycled, by means of the conduit and blower system shown generally at 36, being drawn off from the upper portion of the furnace through the exhaust line 37, and fed thence through a dust collector or cyclone 38, thence over conduits 39, 40, having interposed therein an exhaust fan 41, the cleaned and recycled gases being returned to the lower portion of the furnace over conduits 42, 43, containing dampers as at 44, 45, for controlling the gas flow.

As the shaft 21 revolves, the activated carbon to be regenerated and supplied to the upper hearth 12 as above described, is fed thence from hearth to hearth by means of the rabbles, the teeth of which are arranged at the alternate hearth levels to feed the material toward the central and peripheral apertures of the successive hearths, the regenerated material passing ultimately from the lower portion of the furnace through the discharge line 46 into the quench tank 47, from the base of which the resulting slurry is pumped off over a line 48.

To clearly set forth the advantages which have been derived from the practice of this invention, there follows a comparison of the results obtained by regenerating the same carbon, i.e., Pittsburgh Coke and Chemical Co. Type SGL activated granular carbon, exhausted by decolorizing the same material, corn hydrolysate liquor, in two furnaces, the first of which followed the practices of the art prior to this invention, and the second of which followed the practice of this invention.

*Example I*

*Test A.*—The regeneration of Pittsburgh Coke and Chemical Type SGL carbon was carried out in a multiple hearth furnace at the rate of 50,000 pounds dry weight per 24 hour day. The carbon was exhausted by the decolorization of corn starch hydrolysate solution. The furnace was 16 feet 9 inches O.D. and had seven hearths. The center shaft was rotated at a speed of 1½ r.p.m. Each hearth had two rabble arms with seven teeth per arm. The retention time was about 32 minutes in the furnace. A separate combustion chamber was employed through which gas was recycled from the top hearth to the fifth and seventh hearths. The recycle gas from the top hearth (No. 1) was 900° F. The various hearth temperatures were: No. 1, 900° F.; No. 2, 1100° F.; No. 3, 1350° F.; No. 4, 1450° F.; No. 5, 1700° F.; No. 6, 1750° F.; and No. 7, 1800° F. This furnace was very similar to that of the Gillette et al. patent. The hearth area was 981 square feet. The burn-off rate was found to be 0.125 lb./hr./sq. ft.

*Test B.*—Regenerating the same carbon with the same impurities in it with the same load of 50,000 lbs. per day, using the practices set forth in this invention, the furnace required for the operation which was of the general construction shown in the accompanying drawing but provided with eight hearths, was only 10 feet nine inches O.D. with eight hearths having an area of 365 sq. ft. The principal modifications were as follows: (a) instead of the external combustion chamber, two burners were placed on each of hearths No. 2 and No. 8; (b) supplemental air to the extent of 3000 lbs. per hour total amount was distributed between hearths Nos. 3, 4, 5 and 7; (c) the added nitrogen of this air plus the effect of 800 lbs. of steam per hour from quenching the regenerated carbon in water plus a gas recycle of 800° F. gas—40,000 s.c.f.h. to hearth No. 6 and 10,000 s.c.f.h. to No. 8, were sufficient to dissipate the heat involved in the regeneration; and (d) two rabble arms were used per hearth, each having twelve teeth per arm. The center shaft was rotated at 3 r.p.m. This resulted in double the number of turn overs used in Test A with the same retention time. The burn-off rate was found to be 0.60 lb./hr./sq. ft., more than four times that found in Test A.

*Example II*

Pittsburgh Coke and Chemical Activated Carbon Type CAL is used in the refining of cane sugar. An amount on the order of 10,000 pounds per 24-hour day was regenerated in a 54-inch I.D. six hearth furnace with a hearth area of 84 sq. ft. This furnace was of the general construction shown in the accompanying drawing, wherein instead of having the conventional external combustion chamber as advocated by Gillette et al., this furnace was equipped with two burners on No. 6 hearth and two more on No. 4. Supplemental air was added to the tops of hearths Nos. 6, 4 and 2. The shaft speed was 1½ r.p.m. with two rabble arms per hearth and 8 teeth per arm. In addition to the added nitrogen, heat dissipation was accomplished by cooling the center shaft, by recycling 3000 s.c.f.h. to hearth No. 4 and 3600 s.c.f.h. to hearth No. 6 plus the addition of 190 pounds of steam an hour from the quench tank. The burn-off rate was over 0.40 lb./hr./sq. ft.

While the above examples are addressed to carbohydrate decolorization and the regeneration of carbon therefrom, a wide variety of materials can be decolorized with carbons of this type, also carbon based catalysts often require purging of organic contaminants. In short, this invention finds application wherever the materials taken up by the carbon can successfully be removed.

It should be recognized that each of the four important steps which are involved in this invention are susceptible to a wide variety of means of accomplishment which will be apparent to those skilled in the art.

What is claimed is:

1. In a process of regenerating spent granular activated carbon employing a multiple hearth furnace, the steps of: progressively passing said carbon from top to base of said furnace by rabbling from hearth to hearth and in an atmosphere containing water vapor and carbon dioxide, and while so doing, supplying heat to more than one hearth, at a plurality of points spaced about each such hearth, and at controlled rates at said points, respectively, adjusted to burn off the carbonaceous impurities of said spent granular carbon by reaction principally with said water vapor and carbon dioxide, supplying cool air to more than one hearth, at a plurality of points spaced about each such hearth, at controlled rates at said points, respectively, adjusted to combine with substantially all of the combustible gases of the hearth atmosphere thereat, dissipating thermal energy by heat abstraction from said furnace at a rate substantially exceeding that effected by the nitrogen of said cool air and at rates such as to prevent overheating of said furnace and to maintain a temperature gradient of about 900 to 1900° F. from top to base of said furnace, and while subjecting the carbon granules to rapid and repeated exposure of the hearth atmosphere.

2. In a process of regenerating spent granular activated carbon employing a multiple hearth furnace, the steps of: progressively passing said carbon granules from top to base of said furnace in an atmosphere containing water vapor and carbon dioxide, and while so doing, applying heat from a plurality of sources to more than one hearth, at a plurality of points spaced about each such hearth and at controlled rates at said points, respectively, adjusted to burn off the carbonaceous impurities of said spent granular carbon by reaction thereof principally with said water vapor and $CO_2$ gases present in the hearth atmosphere to produce carbon monoxide and hydrogen gases, supplying cool air to move than one hearth, at a plurality of points spaced about each such hearth and at controlled rates at said points, respectively, adjusted to combine with substantially all of the combustible gases at said points, respectively, for regenerating $CO_2$ and $H_2O$ gases therefrom, dissipating thermal energy by heat abstraction from said furnace at a rate substantially exceeding that effected by the nitrogen of said cool air and at rates preventing overheating of said furnace and to maintain a temperature gradient of about 900 to 1900° F. from top to base of said furnace, and while rabbling said carbon granules at a rate such as to provide a burn rate of said carbon of at least 0.3 lb./hr./sq. ft. of hearth area.

3. A method of regenerating spent granular activated carbon in a multiple hearth furnace, having side-walls penetrated by air tubes and mounting burners at a plurality of hearth levels, and having rotatable rabbling means on each hearth and means for recycling furnace gases, which comprises: progressively feeding said carbon into the top of said furnace while rabbling the same from hearth to hearth and in an atmosphere containing water vapor and carbon dioxide, and while so doing, applying heat from said burners to more than one hearth and at controlled rates such as to burn off the impurities of said spent activated carbon by reaction thereof principally with said water vapor and carbon dioxide present in said hearth atmosphere, supplying cool air through said tubes at a plurality of points to more than one hearth and at a rate such at each such point not substantially exceeding that required to burn the combustible gases present in the hearth atmosphere thereat, introducing steam to at least one hearth, recycling furnace gases from an upper to a lower portion of said furnace, and dissipating thermal energy by heat abstraction from said furnace at a rate substantially exceeding that effected by the nitrogen of said cool air supply, all at relative rates such as to maintain a temperature gradient of about 900 to 1900° F. from top to base of said furnace, and in conjunction therewith, rabbling said carbon granules at a rate such as to provide a burn rate of said carbon of at least 0.3 lb./hr./sq. ft. of hearth area.

4. A method of regenerating spent granular activated carbon in a multiple hearth furnace having side-walls penetrated by air tubes and mounting burners at a plurality of hearth levels, and having rotatable rabbling means on each hearth, and means appurtenant to said furnace for recycling furnace gases, which comprises: progressively feeding said carbon into the top of said furnace while rabbling the same from hearth to hearth and in an atmosphere containing water vapor and carbon dioxide, and while so doing, applying heat from said burners to a plurality of hearths including at least one of the lowermost hearths and at controlled rates adjusted to burn off the impurities of said spent activated carbon by reaction principally with said water vapor and carbon dioxide of said furnace atmosphere, introducing cool air through said tubes at a plurality of points to a plurality of hearths, including at least one hearth disposed at an intermediate zone of said furnace, and at a rate at each such point not substantially exceeding that required to burn the combustible gases present in the hearth atmosphere thereat, recycling furnace gases from an upper to a lower portion of said furnace, and dissipating thermal energy by heat abstraction from said furnace, all at rates relatively proportioned to maintain a temperature gradient of about 900 to 1900° F. from top to base of said furnace, and in conjunction therewith, rabbling said carbon granules at a rate such as to provide a burn rate of said carbon of at least 0.3 lb./hr./sq. ft. of hearth area.

5. In a process of regenerating granular activated carbon in a multiple hearth furnace, the steps of: exposing the hot carbon to an atmosphere maintained at temperature of about 1400–1900° F. and containing $CO_2$ and $H_2O$ which react with the carbonaceous impurities on the carbon to form $CO$ and $H_2$, revivifying the hearth atmosphere by introducing air at a plurality of points on a plurality of hearths to convert the $CO$ and $H_2$ to $CO_2$ and $H_2O$ respectively, thereby avoiding local concentrations of oxygen and excessive temperatures, removing the heat so liberated at a rate substantially in excess of that effected by the nitrogen of the introduced air, in part by recycling gases from the cooler upper hearth to the hotter lower hearths, while abstracting heat in the recycling system, and while subjecting the carbon granules to rapid and repeated rabbling to expose them to the hearth atmosphere and to move them from upper to lower hearths.

References Cited by the Examiner
UNITED STATES PATENTS

| | | | |
|---|---|---|---|
| 1,614,707 | 1/27 | Barnebey et al. | 252—421 |
| 1,806,020 | 5/31 | Parker et al. | 252—418 |
| 2,093,998 | 9/37 | Colbert. | |
| 2,616,858 | 11/52 | Gillette et al. | 263—26 X |
| 2,780,307 | 2/57 | MacAfee | 263—26 |
| 2,966,447 | 12/60 | Walter | 252—421 |

MAURICE A. BRINDISI, *Primary Examiner.*
JAMES W. WESTHAVER, *Examiner.*